United States Patent
Jeon

(10) Patent No.: US 8,780,495 B2
(45) Date of Patent: Jul. 15, 2014

(54) BASE FOR MOTOR AND HARD DISK DRIVE INCLUDING THE SAME

(75) Inventor: Il Geun Jeon, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/317,360

(22) Filed: Oct. 17, 2011

(65) Prior Publication Data

US 2013/0033780 A1 Feb. 7, 2013

(30) Foreign Application Priority Data

Aug. 5, 2011 (KR) ........................ 10-2011-0078212

(51) Int. Cl.
*H05K 5/02* (2006.01)

(52) U.S. Cl.
USPC ................... 360/99.15; 360/99.16; 360/99.17

(58) Field of Classification Search
USPC ........................... 360/99.15–99.17; 369/75.11
See application file for complete search history.

(56) References Cited

U.S. PATENT DOCUMENTS

| | | | | |
|---|---|---|---|---|
| 4,367,503 A | * | 1/1983 | Treseder | 360/99.18 |
| 5,434,729 A | | 7/1995 | Katakura et al. | |
| 6,392,838 B1 | * | 5/2002 | Hearn et al. | 360/99.18 |
| 6,499,261 B2 | | 12/2002 | Hikai | |
| 6,556,372 B2 | * | 4/2003 | Hearn et al. | 360/99.21 |
| 7,420,774 B2 | * | 9/2008 | Sievers et al. | 360/97.11 |
| 7,428,122 B2 | * | 9/2008 | Kimura et al. | 360/99.21 |
| 7,545,598 B2 | * | 6/2009 | Kitahori et al. | 360/99.25 |
| 7,755,228 B2 | | 7/2010 | Kim et al. | |
| 2002/0184936 A1 | * | 12/2002 | Gitlin et al. | 72/379.2 |
| 2004/0032811 A1 | * | 2/2004 | Watanabe | 369/75.2 |
| 2008/0310277 A1 | * | 12/2008 | Iwase | 369/75.11 |
| 2010/0325871 A1 | | 12/2010 | Suzuki | |

FOREIGN PATENT DOCUMENTS

JP 2006-236442 9/2006

* cited by examiner

*Primary Examiner* — Wayne Young
*Assistant Examiner* — Carlos E Garcia

(57) ABSTRACT

There is provided a base for a motor, the base including: a base body formed of a steel plate through a pressing process; and an outer wall part defining an exterior of the base body, in which the outer wall part has a thickness smaller than a thickness of the steel plate in order to increase a contact area with a sealing part.

6 Claims, 4 Drawing Sheets

BASE FOR MOTOR AND HARD DISK DRIVE INCLUDING THE SAME

CROSS-REFERENCE TO RELATED APPLICATIONS

This application claims the priority of Korean Patent Application No. 10-2011-0078212 filed on Aug. 5, 2011, in the Korean Intellectual Property Office, the disclosure of which is incorporated herein by reference.

BACKGROUND OF THE INVENTION

1. Field of the Invention

The present invention relates to a base for a motor and a hard disk drive including the same, and more particularly, to a base for a motor having an improved sealing function from the outside in a base manufactured by pressing process and a hard disk drive including the same.

2. Description of the Related Art

A hard disk drive (HDD), an information storage device of a computer, reads data stored on a disk by using a magnetic head or writes data on the disk.

In the hard disk drive, a head driving part that can reposition the magnetic head on the disk, i.e., a head stack assembly (HSA), is installed in a base and the magnetic head performs its own function while moving to a desired position while being positioned at a predetermined height above a recording surface of the disk by the head driving part.

In the related art, in manufacturing the base provided to the hard disk drive, the base is produced in a post-processing method in which aluminum (Al) is die-cast and thereafter, burrs generated by the die-casting are removed.

However, in the related art die-casting method, forging aluminum (Al) is injected into a mold in a molten state, and as a result, high energy is required for a process due to the requirements of high temperature and high pressure and a process period also increases.

Further, in terms of the lifespan of a die-casting mold, there is a limit in manufacturing a lot of bases with a single mold and the bases manufactured in the die-casting process may be inferior in size precision.

Therefore, the base is manufactured by using a pressing method in order to solve the problem in the die-casting process, but the bases manufactured by the pressing method may basically have a uniform thickness due to the characteristics of bending and cutting a plate material.

Further, an internal space of the hard disk drive (HDD) is sealed by a sealing member attached to the top of the base and the bottom of a cover in order to improve driving characteristics. Here, a contact area between the base and the sealing member becomes an important factor affecting sealing characteristics.

However, when the base is manufactured by using the pressing or forging method, an outer diameter and an outer width of the disk are determined according to an international standard, and as a result, the sizes of an inner wall and an outer wall of the hard disk drive maintaining a predetermined gap from the outer diameter of the disk are also standardized.

Under these limited conditions, when the base is manufactured by the pressing method, the inner wall and the outer wall should be manufactured by a bending process, and as a result, the top surface formed by the inner wall and the outer wall is rounded.

This may cause the contact area to be reduced at the time of attaching the sealing member to the base, and as a result, a sealing function may be deteriorated.

Accordingly, a study for securing a structure having the improved sealing function by overcoming a limit of the uniform thickness of the base even if the base is manufactured by the pressing method is urgent.

SUMMARY OF THE INVENTION

An aspect of the present invention provides a base for a motor that maximizes the performance and the life-span by effectively sealing an internal space of the base while using pressing process and a hard disk drive including the same.

According to an aspect of the present invention, there is provided a base for a motor, the base including: a base body formed of a steel plate through a pressing process; and an outer wall part defining an exterior of the base body, in which the outer wall part has a thickness smaller than a thickness of the steel plate in order to increase a contact area with a sealing part.

The outer wall part may include an inner wall portion bent from a periphery of the base body, an upper wall portion bent from an edge of the inner wall portion, and an outer wall portion bent from an edge of the upper wall portion and coupled with a cover.

At least one of the inner wall portion, the upper wall portion, and the outer wall portion may have a thickness smaller than the thickness of the steel plate.

The top of the upper wall portion may include a flat surface to receive the sealing part thereon.

The top of the upper wall portion may be parallel to the top of the base body.

The edges of the top of the upper wall portion may have raddi of curvature.

According to another aspect of the present invention, there is provided a hard disk drive including: the base for a motor as described above; a spindle motor coupled with the base to rotate a disk; a head driving part moving a magnetic head to a predetermined position on the disk in order to write and read data to and from the disk; and a cover coupled with the base and including a sealing part placed on the outer wall part to seal an internal space of the base.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
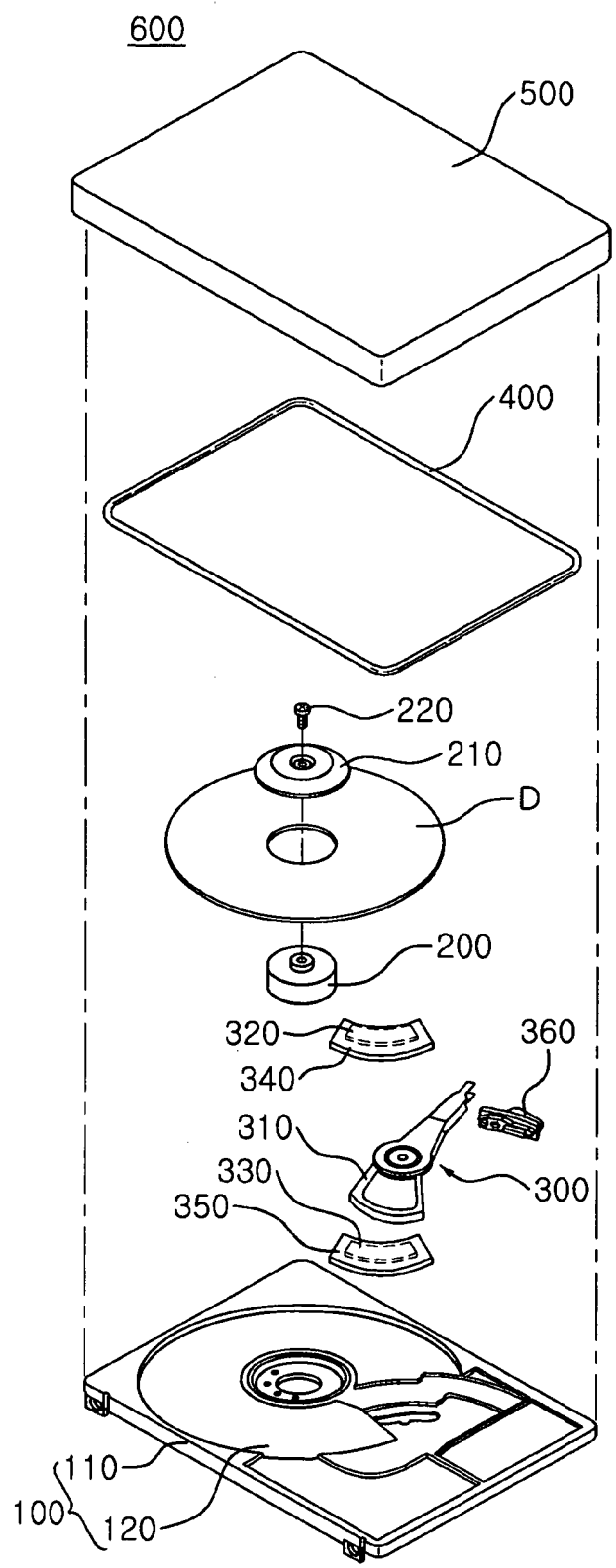
FIG. 1 is a schematic exploded perspective view showing a hard disk drive including a base for a motor according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of components may be exaggerated for clarity, and the same reference numerals will be used throughout to designate the same or like components.

Figure 2:
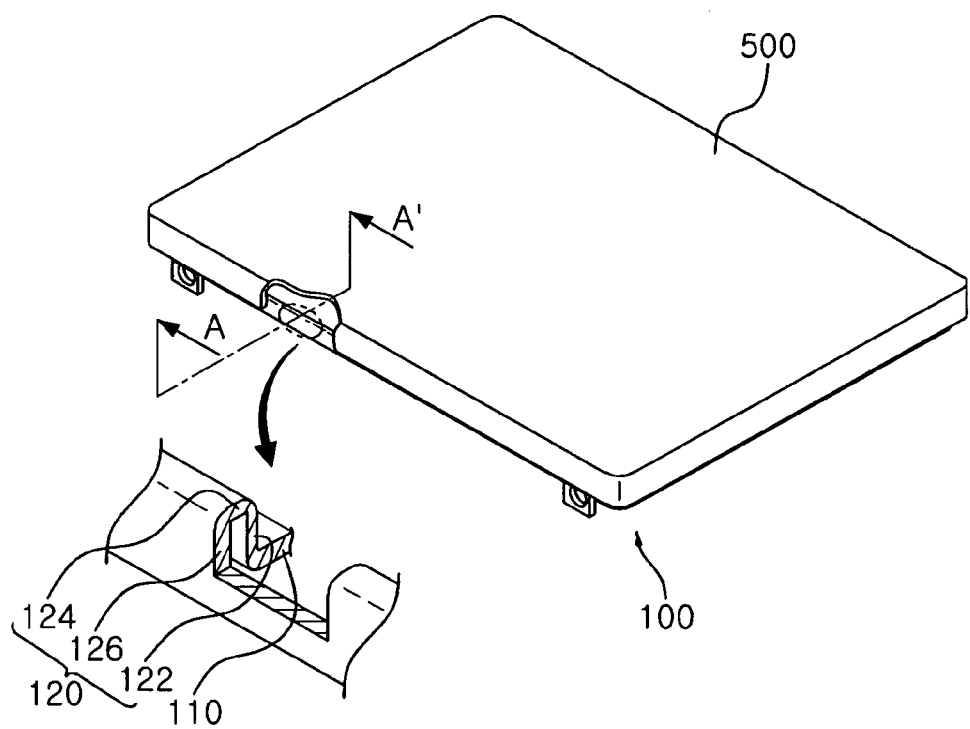
FIG. 2 is a schematic cut-away perspective view showing a hard disk drive including a base for a motor according to an embodiment of the present invention (a sealing part is not shown)
Figure 3:
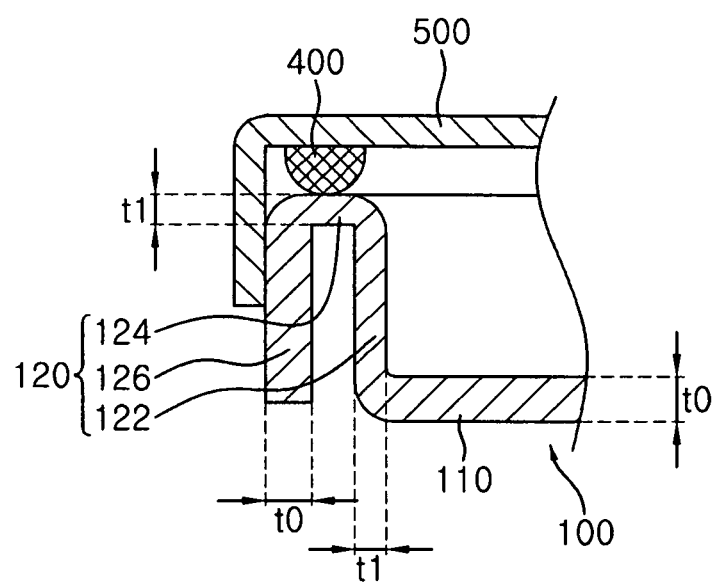
FIG. 3 is a schematic cross-sectional view taken along line A-A' of FIG. 2.

FIG. 1 is a schematic exploded perspective view showing a hard disk drive including a base for a motor according to an embodiment of the present invention, FIG. 2 is a schematic cut-away perspective view showing a hard disk drive including a base for a motor according to an embodiment of the present invention (a sealing part of which is omitted), and FIG. 3 is a schematic cross-sectional view taken along line A-A' of FIG. 2.

Referring to FIGS. 1 through 3, a hard disk drive 600 according to an embodiment of the present invention includes a motor base (hereinafter, referred to as a base) 100, a spindle motor 200 and a head driving part 300 provided in an internal space of the base 100, and a cover 500 with a sealing part 400 sealing the internal space of the base 100.

First, terms regarding directions will be defined, and an upward or downward axial direction may represent a direction toward the cover 500 from the top of the base 100 or vice versa.

The base 100, together with the cover 500, may represent a housing forming an exterior of the hard disk drive 600 according to the embodiment of the present invention, and may include a base body 110 and an outer wall part 120.

Herein, basic shapes of the base body 110 and the outer wall part 120 are formed by a pressing process and thereafter, a final shape of the base 100 may be formed through an additional bending or cutting process.

That is, unlike the base produced in a post-processing method in the related art, in which aluminum (Al) is die-cast, and thereafter burrs generated in the die-casting process are removed, the base 100 according to the embodiment of the present invention may be produced through one or more pressing processes performed on a cold rolled steel sheet (SPCC, SPCE, or the like), a hot rolled steel sheet, a stainless steel sheet, or a light-weight steel alloy sheet such as a boron alloy sheet, a magnesium alloy sheet or the like.

Accordingly, since the base 100 according to the embodiment of the present invention can be manufactured through the pressing process, a processing period and energy consumption are minimized, and as a result, production capacity can be improved.

Herein, the base body 110 may form the internal space of the base 100 and the internal space may represent a space in which the spindle motor 200 and the head driving part 300 to be described below are provided.

The outer wall part 120 may represent an outer wall of the base 100 and specifically, may define an outer side of the base body 110.

That is, the outer wall part 120 may be formed at the periphery of the base body 110 and may include an inner wall portion 122, an upper wall portion 124, and an outer wall portion 126.

The inner wall portion 122 of the outer wall part 120 may be formed by bending the periphery of the base body 110 in the upward axial direction, and the outer wall portion 126 may be formed by bending the inner wall portion 122 in the downward axial direction at a predetermined height thereof.

Herein, a connection portion between the inner wall portion 122 and the outer wall portion 126 may be provided for the placement of the sealing part 400 sealing the internal space of the base 100 and a flat surface for increasing a contact area with the sealing part 400 provided in the cover 500 should be provided in order to maximize a sealing function.

Herein, a standard of the base 100 will be simply described below. In the case of the base 100, most sizes are standardized. In particular, an outer diameter of a disk D, a distance between the outer wall portion 126 and an outer wall portion opposite thereto, and the inner wall portion 122 maintaining a predetermined gap from the outer diameter of the disk D are also standardized.

Of course, according to the related art die-casting process capable of manufacturing a base in which an outer wall portion and an inner wall portion are integrally formed, since an upper wall portion which is a boundary between the outer wall portion and the inner wall portion may be manufactured to have a predetermined flat surface, a surface sufficient to accept the sealing part that seals the internal space of the base may be formed.

However, like the base 100 according to the embodiment of the present invention, when a steel plate, i.e., a cold rolled steel sheet (SPCC, SPCE, or the like), a hot rolled steel sheet, a stainless steel sheet, or a light-weight steel alloy sheet such as a boron alloy sheet, a magnesium alloy sheet or the like, is placed on a press mold and the base 100 is manufactured at a predetermined press pressure, the base 100 basically has a uniform thickness.

Therefore, in the outer wall part 120 of the base 100, the inner wall portion 122 and the outer wall portion 126 should be formed by bending processes to meet an international standard, as described above.

As a result, the connection portion between the inner wall portion 122 and the outer wall portion 126 is formed to be rounded, and a part of the connection portion of the inner wall portion 122 and the outer wall portion 126 of the outer wall part 120 is narrow to accommodate the sealing part 400 that seals the internal space of the base 100.

Herein, in order to solve the problem, in the base 100 according to the embodiment of the present invention, a thickness t1 of the outer wall part 120 is smaller than a thickness t0 of the steel plate forming the base body such that a flat surface may be realized to thereby place the sealing part 400 thereon.

In other words, the base body 110 is formed by the pressing process and thereafter, a part of the outer side is pressurized to have a thickness smaller than the thickness t0 of the steel plate forming the base body and bent in the upward axial direction to form the inner wall portion 122 and bent again to form the upper wall portion 124 and thereafter, bent in the downward axial direction to form the outer wall portion 126.

Therefore, the inner wall portion 122 and the upper wall portion 124 are formed by the bending processes to have the thickness t1 relatively smaller than the thickness t0 of the steel plate forming the base body, the top of the upper wall portion 124 may be formed as the flat surface.

Herein, since the outer wall portion 126 of the outer wall part 120 is coupled with the cover 500, it may maintain a thickness equal to the thickness t0 of the steel plate forming the base body in order to attain coupling strength and be coupled with a joining unit.

A detailed manufacturing process of the outer wall part 120 will be described below with reference to FIG. 4. Herein, the base 100 provided with the outer wall part 120 will be described.

As described above, the inner wall portion 122 and the upper wall portion 124 of the outer wall part 120 may be formed by bending the periphery of the base body 110 in the upward axial direction and thereafter, bending the periphery of the base body 110 outwardly while maintaining the thickness t1 relatively smaller than the thickness t0 of the steel plate forming the base body, and the outer wall portion 126 may be formed by bending the periphery of the base body 110 in the downward axial direction while maintaining the distance between the standardized outer wall portions 126.

Therefore, since the inner wall portion 122 and the upper wall portion 124 are formed by bending the steel plate having the thickness t1 relatively smaller than the thickness t0 of the steel plate, the top of the upper wall portion 124 may have a predetermined flat surface while maintaining the distance between the standardized outer wall portions 126.

Herein, the top of the upper wall portion 124 may be parallel to the top of the base body 110 due to the flat surface.

However, since the upper wall portion 124 is formed by the bending process, the edges of the upper wall portion 124 may have predetermined radii of curvature.

The spindle motor 200 serves to rotate the disk D and is fixedly installed at the center of the base body 110. The disk D is coupled to the spindle motor 200 to thereby rotate with the spindle motor 200 and may include a recording surface where data are recorded.

Herein, a clamp 210 for strongly fixing the disk D to the spindle motor 200 may be joined to an upper end portion of the spindle motor 200 by using a screw 220.

Further, although a single disk D is mounted on the spindle motor 200 in FIG. 1, one or more disks D may be mounted on the spindle motor 200.

As described above, when a plurality of disks D are mounted, ring-shaped spacers for maintaining gaps among the disks D may be provided among the disks D.

The head driving part 300, known as a head stack assembly (HSA), may have a magnetic head mounted thereon and move the magnetic head to a predetermined position to write data to the disk D or read data recorded on the disk D.

Further, the head driving part 300 may move the magnetic head to a predetermined position on the disk D by using a voice coil motor (VCM) including a coil 310 and upper and lower magnets 320 and 330.

Herein, the upper and lower magnets 320 and 330, placed above and below the coil 310 provided in the voice coil motor (VCM), may be coupled with upper and lower yokes 340 and 350, respectively, in order to increase magnetic flux density and be fixed to the base 100.

The voice coil motor (VCM) is controlled by a servo control system and rotates the head driving part 300 around a pivot axis in a direction according to the Fleming's left-hand rule by interaction between current inputted by the coil 310 provided in the voice coil motor (VCM) and a magnetic field formed by the upper and lower magnets 320 and 330.

Herein, in the hard disk drive 600 according to the embodiment of the present invention, an operation starting command is inputted to start rotating the disk D and the voice coil motor (VCM) rotates a swing arm in a counterclockwise direction and moves the magnetic head to the recording surface of the disk D.

On the contrary, when a command for stopping an operation of the hard disk drive 600 is inputted, the voice coil motor (VCM) rotates the swing arm in a clockwise direction to allow the magnetic head to be removed from the disk D.

The magnetic head removed from the recording surface of the disk D is placed in a lamp 360 provided outside the disk D.

Herein, the lamp 360 serves to hold the magnetic head therein and allow the magnetic head to be spaced apart therefrom by a predetermined gap when the magnetic head moves to the disk D, whereby the data of the disk D may be read stably.

The cover 500 may include the sealing part 400 that seals the internal space of the base 100 and is coupled with the outer wall part 120 of the base 100 to form the exterior of the hard disk drive 600 according to the embodiment of the present invention.

Specifically, the sealing part 400 may be provided on an inner sealing surface of the cover 500 and the cover 500 is joined with the outer wall portion 126 of the outer wall part 120 with an additional joining unit to seal the internal space of the base 100.

Figure 4:
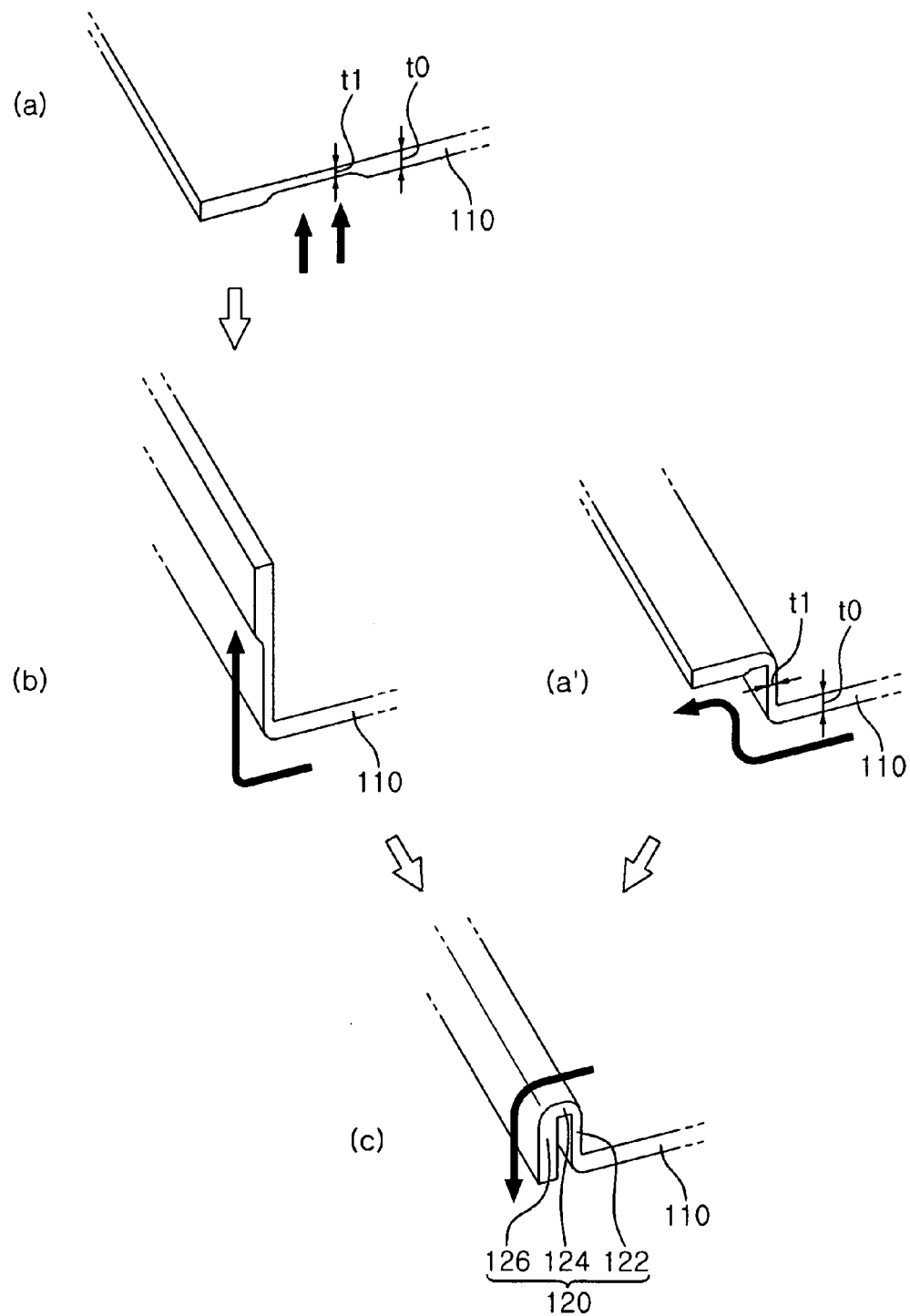
FIG. 4 is a schematic perspective view showing a process of manufacturing a base for a motor according to an embodiment of the present invention.

FIG. 4 is a schematic perspective view showing a process of manufacturing a base for a motor according to an embodiment of the present invention.

Herein, FIG. 4 is a view illustrating a process of manufacturing the outer wall part 120 of the base 100 and detailed features of the base 100 are omitted therein.

In the base 100 according to the embodiment of the present invention, the base body 110 may be manufactured by a pressing process and the basic shape thereof may have an overall uniform thickness t0 due to the characteristics of the pressing process.

In order to form the outer wall part 120, the periphery of the base body 110, i.e., a part thereof to be formed as the inner wall portion 122 and the upper wall portion 124 are pressurized to have a thickness t1 smaller than the thickness t0 of the steel plate forming the base body (see FIG. 4A).

Here, the part having the smaller thickness t1 may form the inner wall portion 122 and the upper wall portion 124 of the outer wall part 120, while the outer wall portion 126 may have the thickness t0 of the steel plate as it is, in order to join the cover 500.

Thereafter, the periphery of the base body 110 is bent in the upward axial direction to form the inner wall portion 122 of the outer wall part 120 and thereafter, is bent outwardly again to prepare for forming the upper wall portion 124 and the outer wall portion 126 (see FIG. 4B).

Further, the thickness t1 smaller than the thickness t0 of the steel plate is formed by pressurizing the part to be formed as the inner wall portion 122 and the upper wall portion 124 described with reference to FIGS. 4A and 4B and a procedure of preparing for forming the upper wall portion 124 and the outer wall portion 126 may be implemented as a single process as shown in FIG. 4A'.

That is, simultaneously with the process for forming the inner wall portion 122 by bending the periphery of the base body 110 in the upward axial direction and forming the upper wall portion 124 and the outer wall portion 126 by bending it again outwardly, the thickness t1 smaller than the thickness t0 of the steel plate may be formed.

After performing the preparation, the upper wall portion 124 and the outer wall portion 126 may be formed by bending the edge of the upper wall portion 124, i.e., the edge of a part having a thickness smaller than the thickness t0 of the steel plate in the downward axial direction (see FIG. 4C).

Through the above-described process, the upper wall portion 124 may have a flat surface to receive the sealing part 400 in the connection portion between the inner wall portion 122 and the outer wall portion 126 of the outer wall part 120, whereby contact efficiency between the upper wall portion 124 and the sealing part 400 may be maximized.

That is, since the inner wall portion 122 and the upper wall portion 124 are formed by the bending processes while having the thickness t1 smaller than the thickness t0 of the steel plate, the upper wall portion 124 with the flat surface can be realized even in spite of maintaining a distance between the standardized outer wall portions 126 and a gap between the outer diameter of the disk D and the inner wall portion 122.

Accordingly, even if the base 100 is manufactured by the pressing process, the sealing part 400 provided in the cover 500 may be strongly attached to the top of the upper wall portion 124 to thereby improve the sealing function and as a result, the performance and lifespan of the hard disk drive 600 can be maximized.

As set forth above, in a base for a motor and a hard disk drive including the same according to embodiments of the present invention, an internal space of the base can be effectively sealed even in the case of being manufactured by a pressing process.

Further, since a process period and energy consumption can be minimized by manufacturing the base using the pressing process, a production capacity can be improved.

While the present invention has been shown and described in connection with the exemplary embodiments, it will be apparent to those skilled in the art that modifications and variations can be made without departing from the spirit and scope of the invention as defined by the appended claims.

What is claimed is:

1. A base for a disc drive motor, the base comprising:
   a base body formed of a steel plate; and
   an outer wall part forming an exterior of the base,
   wherein the outer wall part comprises an inner wall portion bent from an edge of the base body, an upper wall portion bent from an edge of the inner wall portion and an outer wall portion bent from an edge of the upper wall portion,
   wherein the upper wall portion extends between the inner wall portion and the outer wall portion,
   wherein at least a portion of the upper wall portion forms a surface to accommodate a sealing part,
   wherein the outer wall portion forms the outermost exterior of the base,
   wherein at least a portion of the inner wall portion has a thickness smaller than that of the outer wall portion, and
   wherein the outer wall portion extends below the upper surface of the base body.

2. The base of claim 1, wherein at least the portion of the inner wall portion has a thickness smaller than a thickness of the base body.

3. The base of claim 1, wherein edges of a top of the upper wall portion have radii of curvature.

4. A hard disk drive, comprising:
   the base for a motor of claim 1;
   a spindle motor coupled with the base to rotate a disk;
   a head driving part moving a magnetic head to a predetermined position on the disk in order to write and read data to and from the disk; and
   a cover forming an internal space with the base, wherein the cover and the upper wall portion are coupled through a sealing part, and the internal space is sealed by the sealing part.

5. The base of claim 1, wherein the inner wall portion is extended in an upward axial direction with respect to the base body,
   the upper wall portion is extended in a direction parallel to the base body, and
   the outer wall portion is extended in a downward axial direction with respect to the base body.

6. The base of claim 1, wherein a space is formed between the inner wall portion and the outer wall portion, a top of the space being closed by the upper wall portion and a bottom of the space being open.

* * * * *